United States Patent [19]
Johnson

[11] 4,114,831
[45] Sep. 19, 1978

[54] CONCENTRIC REEL DRIVE FOR A TAPE CASSETTE

[75] Inventor: Robert B. Johnson, Scottsville, N.Y.

[73] Assignee: Eastman Kodak Company, Rochester, N.Y.

[21] Appl. No.: 720,288

[22] Filed: Sep. 3, 1976

[51] Int. Cl.$^2$ ............... G11B 15/32; G11B 23/10
[52] U.S. Cl. ...................... 242/194; 74/204; 242/201
[58] Field of Search ............... 242/194, 193, 197, 198, 242/199, 200, 201, 202, 203, 204, 206, 208, 209, 210, 54.1; 74/204; 352/156; 360/96

[56] References Cited

U.S. PATENT DOCUMENTS

| 1,033,273 | 7/1912 | Ryszka | 74/204 |
| 2,914,264 | 11/1959 | Blain et al. | 242/193 |
| 3,190,133 | 6/1965 | Foufounis | 74/204 |
| 3,352,976 | 11/1967 | Gonmori | 242/194 X |
| 3,504,135 | 3/1970 | Hammond | 360/96 |
| 3,677,494 | 7/1972 | Protas | 242/194 |
| 3,895,766 | 7/1975 | Thevenaz | 242/201 |

FOREIGN PATENT DOCUMENTS

434,331 9/1926 Fed. Rep. of Germany.
1,082,091 5/1960 Fed. Rep. of Germany.

*Primary Examiner*—George F. Mautz
*Attorney, Agent, or Firm*—Robert F. Cody

[57] ABSTRACT

A reel drive apparatus is provided for driving the reels of a coaxial-reel tape cassette in fast forward or reverse. In one embodiment, as the cassette is placed on a tape recorder, a friction wheel mounted for rotation on a flexible shaft extending from the recorder locates in a space defined between a pair of concentric flanges mounted for rotation with respect to the reels. The friction wheel is disposed to alternately engage the concentric flanges and reversibly drive the reels. By securing each flange to a corresponding one of the coaxial reels, the tape is positively transported in either direction.

4 Claims, 7 Drawing Figures

CONCENTRIC REEL DRIVE FOR A TAPE CASSETTE

BACKGROUND OF THE INVENTION

1. Field of the Invention

This invention relates in general to apparatus for driving a tape reel mounted for rotation on a tape recorder; more particularly, the invention is concerned with an apparatus for driving a reel mounted for rotation in a removable container of the type which is used with a magnetic tape recorder.

2. Description Relative to the Prior Art

The invention has general significance as a concentric-type friction drive for the supply and takeup reels of a tape recorder. Concentric friction gearing per se dates back to the nineteenth century and was used in such large-scale machinery as sawmills. Such drives include an output wheel having flanges of unequal diameter mounted for rotation on the wheel about a common axis. The diameters of the flanges are so chosen as to define an annular recess into which a friction drive wheel rotatably fits without contacting the flanges. Each flange further includes a frictional surface for cooperating with the friction drive wheel. With the drive wheel rotating in one direction only, the output wheel will change its speed and direction of rotation by frictionally engaging the drive wheel with one or the other of the flange surfaces. Concentric gearing is used in the recording art to reversibly drive, for example, a record carrying turntable (U.S. Pat. No. 3,190,133). It also finds occasional use in the internal mechanism of a tape recorder to reversibly drive, for example, a capstan (U.S. Pat. No. 2,914,264).

Cartridges and cassettes for containing a length of tape which is wound on a reel are also well established in the prior art. Such devices customarily require that the reel in the cartridge, or each reel in the cassette, be driven by a distinct drive shaft which is provided as part of the recording machine. Consequently, as the cassette or cartridge is placed on the recording machine, the hub of the reel in the cartridge, or the hubs of each reel in the cassette, must be made to receive the driven spindle(s) of the recording machine. If the reels are coaxially mounted in the cassette, then the hubs too must be so disposed as to separably receive a coaxial pair of driven spindles.

Specifically to simplify the drive mechanism for reels mounted side by side in a cassette, Fundingsland (U.S. Pat. No. 3,908,931) provides a bidirectional drive mechanism where the hubs or reels are engaged by a single pivotally-mounted drive wheel which is part of the recording device. The wheel is inserted into the cassette through an access slot for selective, frictional contact with either the supply or takeup reel. Since the reels are mounted side by side in the cassette, it is necessary to reverse the drive wheel, in addition to pivotally shifting the wheel, to effect reverse tape movement.

While not so restricted, the invention acquires a special significance when it is used as a concentric-type friction drive for the supply and takeup reels of a coaxial-reel tape cassette. While not employing a concentric-type friction drive, Gonmori (U.S. Pat. No. 3,352,976) illustrates a previous proposal to frictionally drive a coaxial-reel cassette. Gonmori provides an opening in the cassette for inserting a drive shaft into a space left between the two reels; the shaft is made tiltable or otherwise adjustable so as to obtain selective driving contact with the edge of either of the two reels. In this arrangement the direction of feed of the tape depends on which of the two reels is driven. Thus the recorder may be shifted from "rewind" to either "record" or "play" and back again without reversing the motor. Mechanically, the Gonmori device is similar to a rim drive in that the driving forces are applied at some distance from the reels' axis. The unbalanced effect thus obtained is less than desirable and likely to require some compensation in the structure of the reels.

The present invention acquires further significance when used with a constant torque motor or negator type spring interdrive between the supply and takeup reels. The negator — as described in U.S. Pat. No. 2,996,264 — is a tight spiral spring of thin ribbon-like metal which tends to recoil itself with constant torque when unwound. The negator spring is in an unwound (pretensioned) position at the beginning of the recording cycle and causes the takeup reel to rotate a predetermined number of turns relative to the supply reel during a complete cycle. This predetermined number of turns is about equal to the additional turns that the takeup reel must rotate, compared to the supply reel, to wind upon itself one-half the total length of tape initially on the supply reel. During this interval, the rate at which the tape passes the transducer or recording head is regulated by the constant speed characteristic of the capstan drive although minimal capstan power is required to transport the tape. After one-half the tape has been wound on the takeup reel and winding proceeds further, the negator spring reverses itself and begins to unwind to its beginning (pretensioned) position. Now the supply reel rotates a predetermined number of additional turns relative to the takeup reel as the remainder of the tape is wound up. Consequently, the interdrive between the two reels functions to rotate both reels in the same direction but at different rates while substantially constant tension is maintained throughout the tape path.

SUMMARY OF THE INVENTION

Although concentric drives have been widely applied in the art, little notice has ever been taken of the inherent separability of the friction driving wheel from the flange-containing driven wheel. Because of the clearances between the friction drive wheel and its associated friction flanges, the concentric drive essentially comprises two parts easily assembled and disassembled. The friction wheel is particularly adapted for intermittent and repeated insertion and removal from the recess defined between the two flanges. Building upon this recognition, the invention provides a cartridge or cassette-type recording machine wherein the point of separability between the two components — the cartridge or cassette and the machine — resides in the concentric drive train itself.

With this in mind, a tape recorder reel drive is provided for reversibly driving a tape reel mounted for rotation in a tape container. The container includes an access opening which enables the reel drive to associate with a gear member mounted in the container with respect to the reel for rotating the reel in a forward or reverse direction. By providing the gear member with a pair of flanges of unequal diameter mounted for rotation on the gear member about a common axis with the reel, an annular recess is provided between the flanges for cooperation with the tape recorder reel drive. A shiftable drive member, included with the reel drive, is inserted into the recess when the container is placed on the recorder. The combination of the shiftable drive member and the flanges form a concentric gear train for reversibly driving the reel. Although the flanges and the shiftable drive member may include toothed surfaces which gear with each other, friction surfaces on both the flanges and the shiftable drive member have also been found to provide the necessary engagement.

The foregoing apparatus is particularly suited for reversibly driving superjacent takeup and supply reels mounted for rotation in the type of cassette which employs internally mounted rollers to minimize tape-to-guide friction as the tape passes from reel to reel. Where the cassette utilizes fixed internal guide surfaces, relatively greater frictional forces are generated and, while the fore-going gear member may prove sufficient in certain situations, a driving connection to both reels is found to be more desirable for providing both forward and reverse tape motion. Furthermore, torque requirements of the reel drive are minimized if the drive is adapted to push the tape off the respective reel in both fast forward and reverse. Therefore, by coaxially disposing the reels within the cassette, the invention further provides that one of the flange surfaces is formed on a post member which is mounted from one of the reels on a common axis for rotation therewith while the other flange surface is formed on a skirt member which hangs from the other of the reels on a common axis also for rotation therewith. The skirt member and the post member are so concentrically disposed with respect to each other that the shiftable drive member may be engaged with either of the concentric surfaces for driving the tape off the respective reel.

The invention, in its foregoing aspects, is concerned with shifting the drive member from one flange surface to the other. In one embodiment, the shiftable drive member includes a pivotable shaft for swinging a friction wheel on one end thereof from one friction surface to the other. In a further presently preferred embodiment, the shiftable drive member comprises a flexible shaft disposed to flex a friction wheel from one friction surface to the other by means of a lever connection to rewind and fast forward control buttons.

BRIEF DESCRIPTION OF THE DRAWINGS

The invention will be described with reference to the figures, wherein.

DESCRIPTION OF THE PREFERRED EMBODIMENT

Because cassette and cartridge recording machines are well known, particularly in connection with magnetic tape recording, the present description will be directed in particular to elements forming part of, or cooperating more directly with, the present invention. Recorder, and cassette and cartridge, elements not specifically shown or described herein may be selected from those known in the art.

Figure 1:
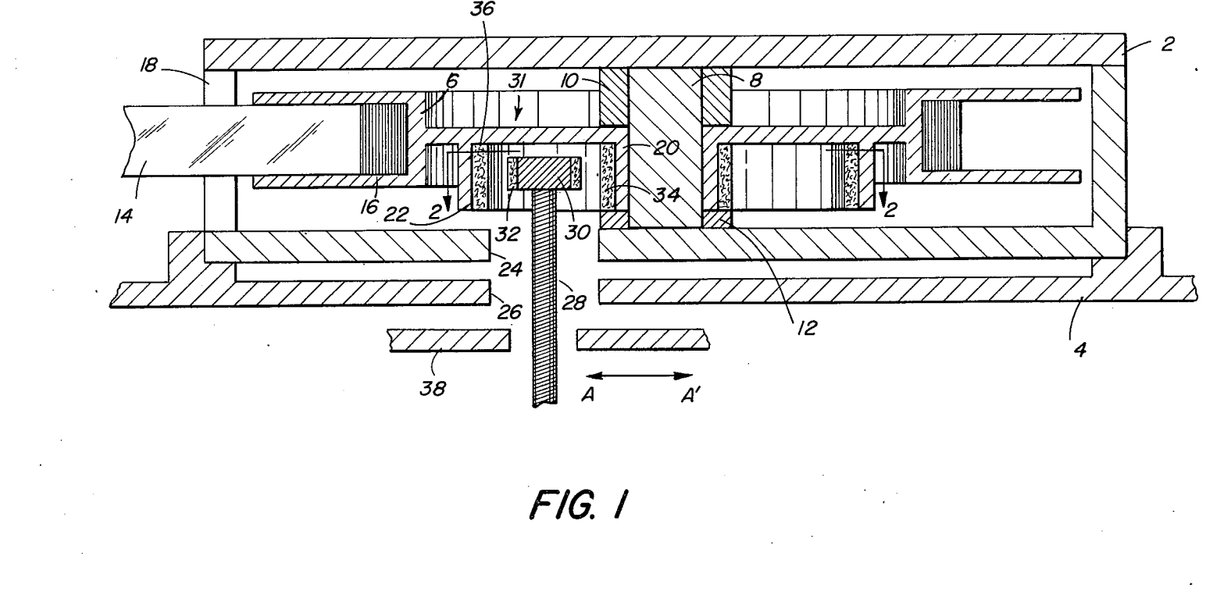
FIG. 1 is a cross-sectional view helpful in illustrating the use of the invention with a cartridge.

Referring now to FIG. 1, a cartridge 2 and a portion 4 of the deck of a recording and playback machine is illustrated. The cartridge 2 includes a reel 6 mounted for rotation about a central post 8. Spacers 10 and 12 separate the reel 6 from the walls of the cartridge 2. A tape 14 has one end attached to the reel 6 and includes several convolutions 16 wound around the reel 6. The tape 14 passes through a window 18 in the cartridge 2 and thereafter cooperates with elements of the tape recorder, such as a capstan and a recording head, in a manner well known in the art.

The principle of the invention is generally illustrated by a concentric drive train 31. The concentric drive train 31 includes a pair of flanges 20 and 22 of unequal diameter which are mounted for rotation about a common axis with respect to the center post 8. An opening 24 in the cartridge overlies an opening 26 in the recorder deck 4 when the cartridge is placed on the recorder. A drive shaft 28, mounted for rotation in an unvarying direction from a reel drive motor or a customary intermediate gear train (not shown), is disposed to pass through the opening 26 and enter the cartridge 2 by way of the opening 24 when the cartridge 2 is placed for operation on the recorder. The drive shaft 28 is provided with a drive wheel 30 having a gear surface 32. Disposed opposite the gear surface 32 are a pair of gear surfaces 34 and 36 mounted on the flanges 20 and 22, respectively. The shaft 28 is rotatably guided by a plate 38 which is adapted to move in either direction as described by an arrow A–A'. Being laterally, as well as rotatably, guided by the plate 38, the shaft 28 is further adapted to be shifted in the direction A–A' in response to the movement of the plate 38. For this purpose, the shaft 28 may be made shiftable by comprising a flexible or pivotable shaft. If the shaft 28 is to pivot, a gimbal joint may be provided to allow free inclination in any direction.

In operation, when the plate 38 is moved in the direction A', the shaft 28 is moved sideways in the direction A' until the gear surface 32 engages the gear surface 34. Rotation of the shaft 28 then rotates the reel 6 in a first direction. Alternatively, when the plate 38 is moved in the direction A, the shaft 28 is also moved sideways in the direction A until the gear surface 32 engages the gear surface 36. Rotation of the shaft 28 then rotates the reel 6 in a second direction opposite to the first direction. The position of the gear wheel 30 as shown in FIG. 1 comprises an idling position, whereas its engagement with the gear surface 34 may constitute a reverse position and its alternative engagement with gear surface 36 may constitute a fast forward position. Because of the different diameters of the concentric gears, the velocity of rotation in the reverse position is greater than the velocity of rotation in the fast forward position. This also means that, should a reversible shaft 28 be provided, the concentric gears could alternatively provide two different velocities in the same direction of rotation.

Figure 2A:
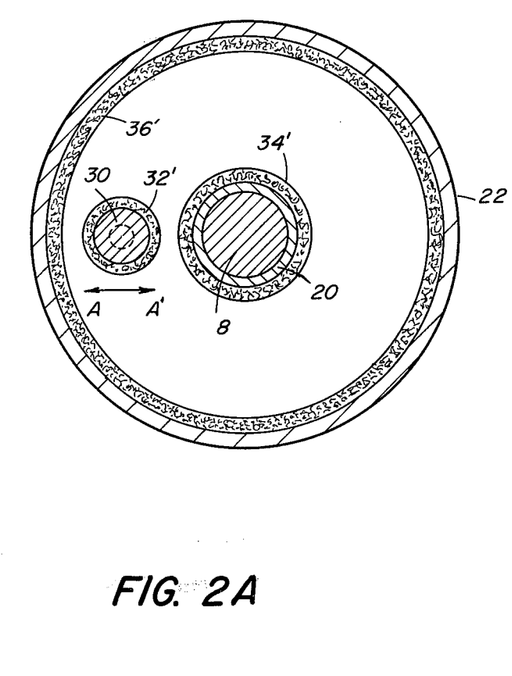
FIGS. 2A and 2B are top views of two embodiments of the concentric gearing of the invention taken generally along line 1—1 in FIG. 1.
Figure 2B:
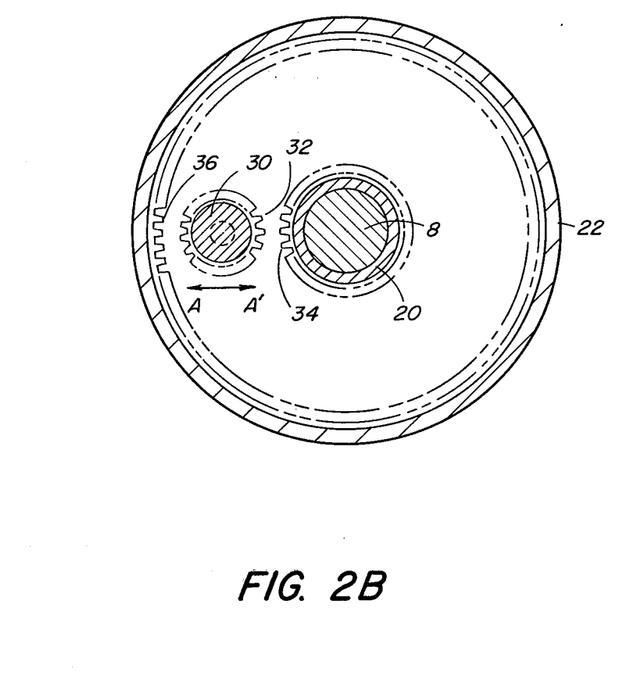

FIGS. 2A and 2B illustrate two embodiments of the gear surfaces 32, 34, and 36. In FIG. 2B, each gear surface 32, 34, and 36 is a toothed gear wheel which correspondingly meshes when the shaft 28 is moved either in the direction A or A'. FIG. 2A illustrates the presently preferred embodiment wherein each gear surface 32', 34', and 36' consists of a frictional material so chosen as to frictionally gear each with the other. The drive shaft 28 transmits motion to the reel 6 by the frictional engagement of the gear surface 32' with either of the gear surfaces 34' or 36'. Although the gear surfaces 32', 34', and 36' are illustrated as separate from the flanges 20 and 22 and the drive wheel 30, it is clear that the gear surfaces 32', 34', and 36' could be formed integrally with, and of the same material as, the flanges 20 and 22 and the drive wheel 30. This is particularly likely if the frictional surfaces pictured in FIG. 2A are used. In FIG. 1, the concentric drive train 31 is so designed as to be separable; that is, the portion of the train comprising the rotatable driving shaft 28 and driving wheel 30 is separable from the driven flanges 20 and 22 when the tape container 2 is removed from the recorder 4.

Figure 3:
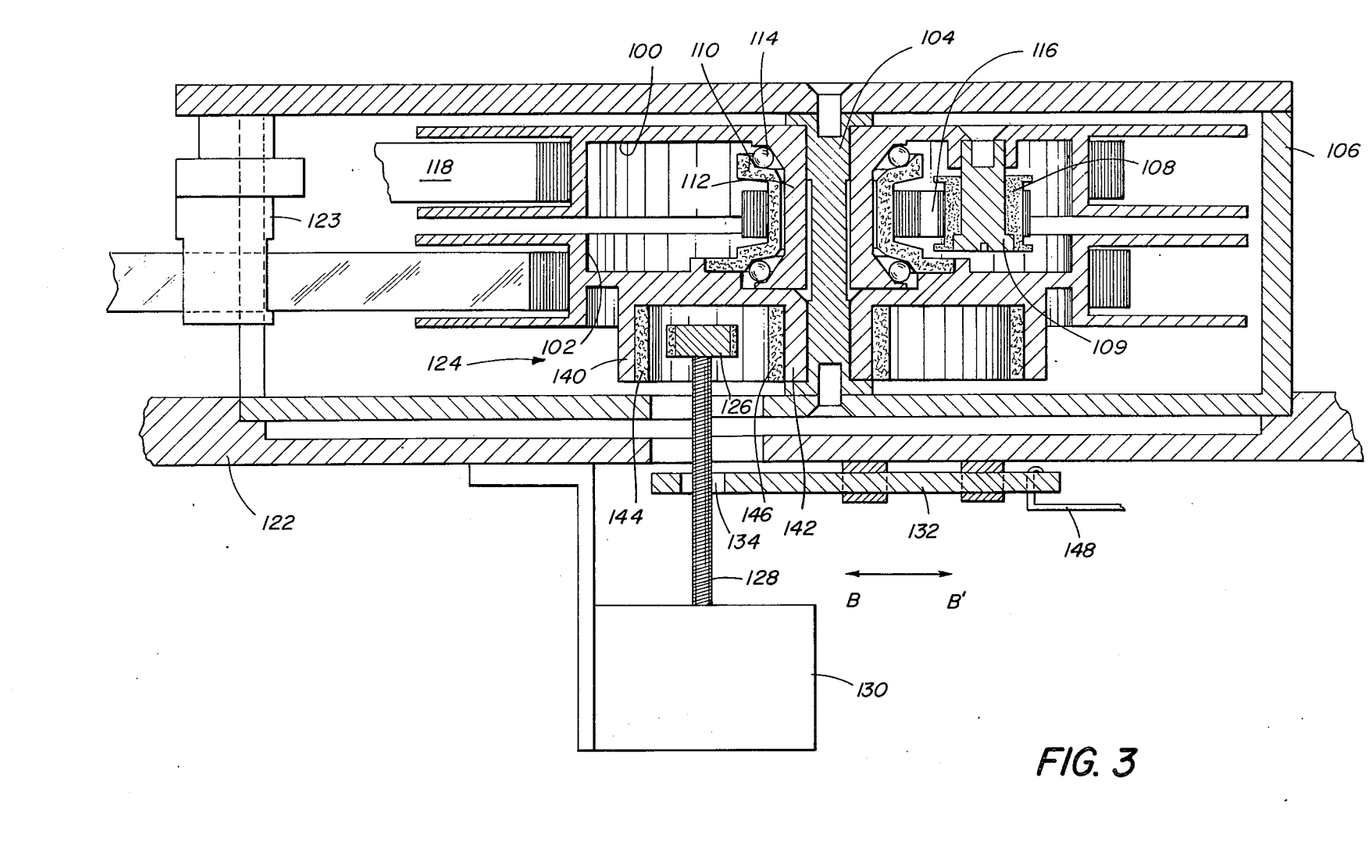
FIG. 3 is a cross-sectional view illustrating an embodiment of the invention for use with a coaxial-reel cassette having a negator spring interdrive.

Referring now to FIG. 3, the invention is shown in use with a coaxial-reel cassette having a negator spring interdrive. Two tape reels 100 and 102 are shown rotatably mounted on a shaft 104 in a cassette body 106. The reel 102 serves as a supply reel for the tape system while the reel 100 serves as a takeup reel. A spring drum 108 is rotatably attached to the takeup reel 100 by means of a shaft 109. A spring motor hub 110 is firmly attached to the supply reel 102 for rotation therewith around the shaft 104. Taking particular note of the construction of the takeup reel 100, an inner journal 112 extends from the reel 100 and between the shaft 104 and the spring motor hub 110 for rotation upon ball bearings 114 and the shaft 104. The negator spring interdrive is completed by a spring 116 which is wrapped at one end around the hub 110 and at the other end around the drum 108.

A magnetic tape 118 extends from the stack on the supply reel 102 past the cassette guide 123 and through an opening 120 in the cassette 106 for further cooperation with the mechanism (not shown) of a tape recorder, partially shown by the deck 122. The tape is then returned to the takeup reel 100. A capstan (not shown) pulls the tape off the supply reel 102 and causes the reel to rotate. Rotation of the supply reel 102 causes the hub 110 to rotate and to transmit torque through the spring 116 to the spring drum 108 which, in turn, drives the takeup reel 100 to take up the tape from the capstan. Since the operation of a negator spring interdrive is described in the aforementioned U.S. Pat. No. 2,996,264, further explanation will be made only to the extent necessary to describe the invention.

A reversible concentric drive apparatus is generally shown at 124 for driving the tape 118 in either a fast forward or reverse direction. A frictional drive puck 126 is mounted for rotation on a flexible shaft 128 which is rotated by a motor 130. The shaft 128 is controllably flexed by means of a sliding bar 132 having an opening 134 which freely receives the rotatable shaft 128. The portion of the reversible concentric drive apparatus thus far described is permanently associated with the tape recorder. Another portion, permanently associated with the cassette, includes a pair of concentric flanges 140 and 142 between which is an annular recess adapted to receive the drive puck 126. In this embodiment, the flanges 140 and 142 are mounted from the supply reel 102. This necessitates some mechanism — such as the negator spring interdrive — for rotating the reel 100 when tape is being played off of reel 102 and onto reel 100. The basic requirement is one of maintaining tension in the tape 118 no matter which direction it is travelling. Frictional surfaces 144 and 146 are disposed on opposing faces of the flanges for engagement with the drive puck 126.

What is so far provided is a separable concentric gear which forms a working arrangement when the cassette is placed on the recorder. As illustrated in FIG. 3, the shaft 128 is in an idling position and, as such, can be continuously rotated without interfering with the normal record or playback operation of the cassette. In other words, the motor 130 can be continuously operated and components normally interlocking its operation to recorder functions are therefore unnecessary. When it is desired to reverse the direction of tape travel, an appropriate control button is depressed and a linkage 148 pulls the bar 132 in a direction shown by an arrow B'. The edge of the opening 134 engages and displaces the shaft 128 sideways until the frictional surface of the drive puck 126 rotatingly engages the frictional surface 146 of the flange 142. Similarly, when it is desired to increase the forward speed of the tape 118, another appropriate control button is depressed and the linkage 148 pushes the bar 132 sideways in a direction shown by an arrow B until the drive puck 126 rotatingly engages the frictional surface 144 of the flange 140.

Figure 4:
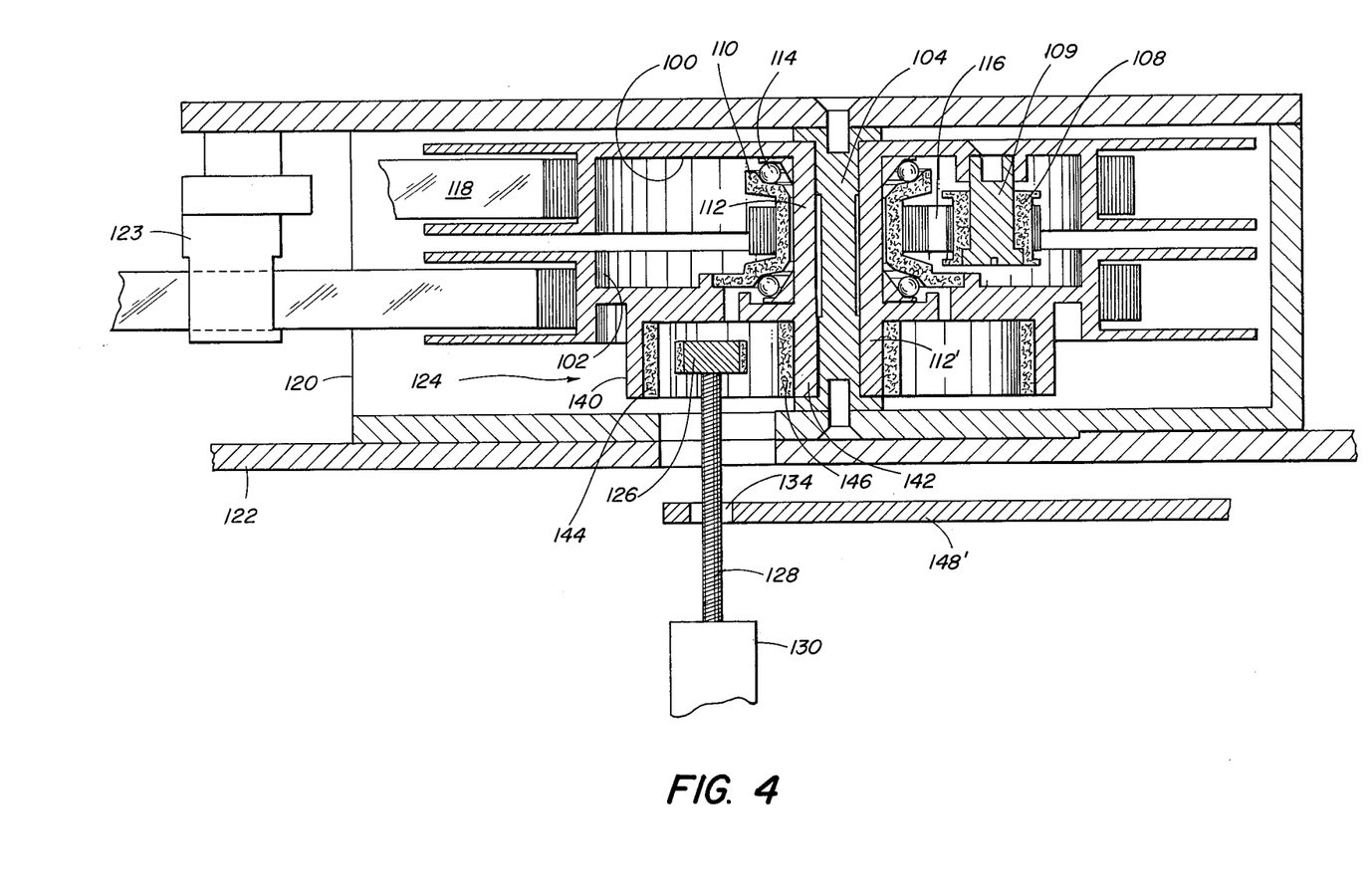
FIG. 4 is a cross-sectional view illustrating a presently preferred embodiment of the invention for use with both reels of a coaxial-reel cassette having a negator spring interdrive.

It should be noted that, in FIG. 3, the supply reel 102 is made to bear the brunt of both forward and reverse drive since both driven flanges 140 and 142 are integrally formed with that reel. Insofar as the guide 123, and other guides not illustrated but in contact with the tape 118, have suitable surfaces, the negator spring interdrive will exhibit sufficient torque on the takeup reel 100, during fast forward drive, to properly take up the tape from the supply reel 102; yet the interdrive will not cause the takeup reel 100, during reverse drive, to inhibit loading of the supply reel 102. However, it has been found that the reel drive operates more efficiently and dependably if the torque requirements of the drive puck 126 are minimized both during fast forward and reverse drive. In the heretofore described system, the tape is pushed off of the supply reel 102 during fast forward drive and pulled onto the supply reel 102 during reverse drive. Pushing the tape off of the reel and allowing the interdrive to take up the resulting slack tape has been found to minimize the torque requirements of the puck drive. Typically, this means less wear on the surface of the drive puck 126. Consequently, the presently preferred embodiment in FIG. 4 is provided to alleviate this problem. The supply reel 102 now terminates at its junction point with the spring motor hub 110 and no longer extends into rotating contact with the shaft 104. In its place, a sleeve 112' extends from the journal 112 and supports the flange 142. In effect, then, the drive puck 126 directly drives the takeup reel 100 when in the reverse (or rewind) position and, as before, the supply reel 102 when in the fast forward position. The resulting allocation of driving force to the appropriate reel pushes the tape, in either drive configuration, from one reel to the other and therefore minimizes the torque requirements of the reel drive.

Figure 5:
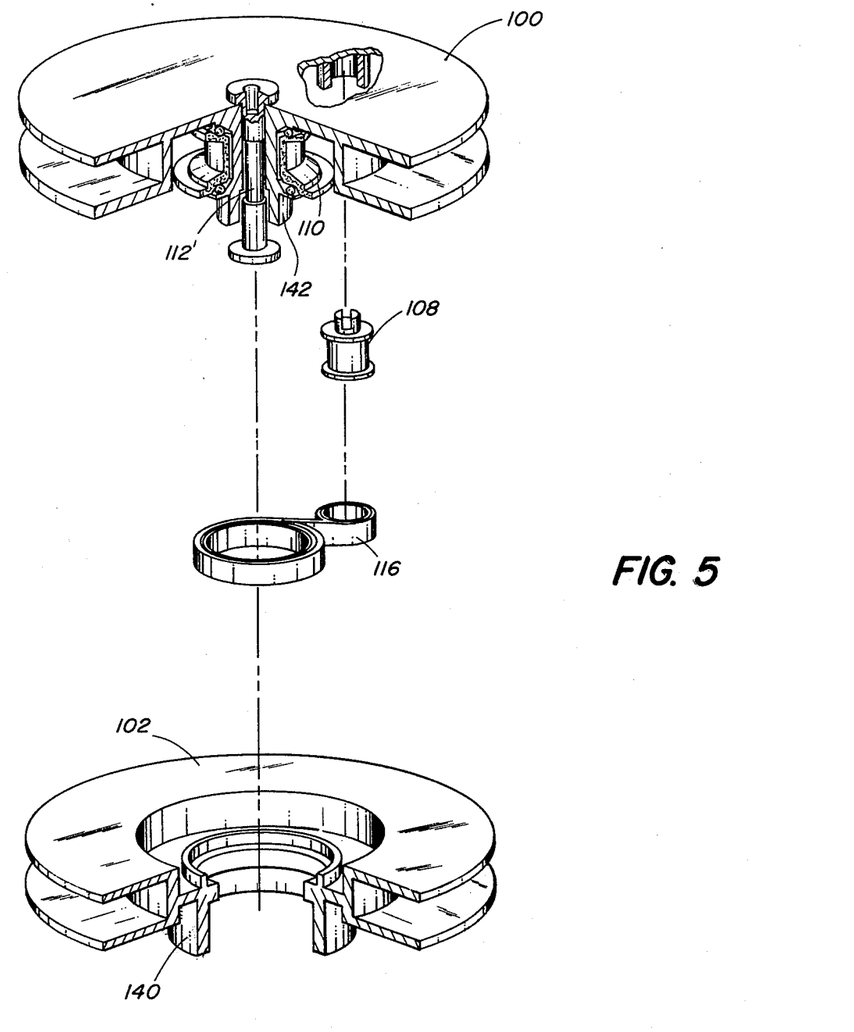
FIG. 5 is an exploded perspective view of the coaxial reels of FIG. 4, showing the concentric gear surfaces and the negator spring interdrive.
Figure 6:
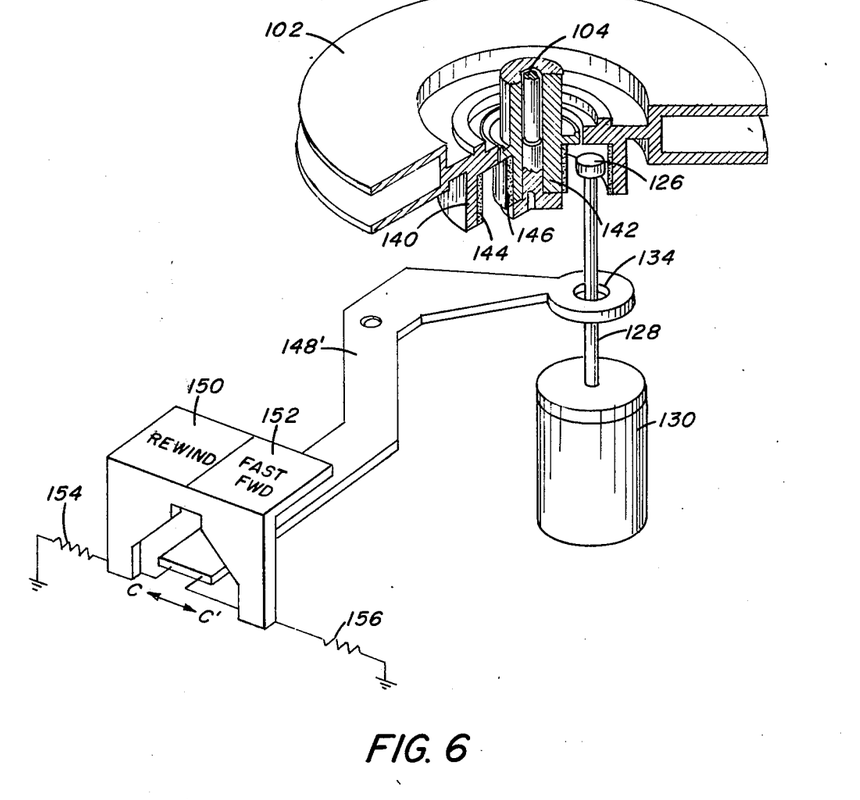
FIG. 6 is a perspective view, partially in schematic, of the embodiment of the invention illustrated in FIG. 4, showing the connection of the flexible shaft to the control buttons.

FIG. 5 illustrates a perspective view, taken from FIG. 4, of the takeup and supply reels, the negator spring interdrive and the portion of the concentric drive which is mounted in the cassette. When the cassette is placed on the recorder, the other portion of the concentric drive which is permanently mounted in the recorder enters the annular recess formed between the flanges 140 and 142. This is seen in perspective in FIG. 6. Taken together, the perspective views in FIGS. 5 and 6 show that the flange 142 may be considered part of a post member extending from the takeup reel 100 while the flange 140 is part of a skirt member hanging from the supply reel 102. The puck penetrates the space between the post 142 and the skirt 140 for alternate engagement therewith. Referring to FIG. 6 in particular, the driving puck 126 is shown in its neutral position. A rewind button 150 and a fast forward button 152 are provided for displacing a linkage 148' (also shown in FIG. 4) either in a direction C or C', respectively. When the fast forward button 152 is depressed, the linkage 148' is forced sideways in the direction C and in turn forces the driving puck 126 into contact with the skirt 140. Similarly, when the rewind button 150 is depressed, the linkage 148' is forced sideways in the direction C' and in turn forces the driving puck 126 into contact with the post 142. When both buttons 150 and 152 are released from the linkage 148', a pair of springs 154 and 156 return the linkage to a neutral position whereat the shaft 128 freely rotates without contacting the edges of the opening 134. The driving puck is then in its neutral position.

The negator spring interdrive is shown by way of illustrating a preferable constant torque tape transport system useful with the invention. Each reel is then rotated sufficiently to maintain a constant tape tension. The advantage of settling this variable rotation rate requirement by means of a separate interdrive is that the drive puck 126 is then free to rotate at a constant rate. If, as in the embodiment illustrated in FIG. 4, the drive puck 126 alternatively and positively contacts either the supply reel 102 or the takeup reel 100, a constant torque motor, or a tendency drive, or other similar apparatus may be used in connection with the drive shaft 128, and in place of the negator spring interdrive, for maintaining substantially constant tape tension. On the other hand, also with reference to the FIG. 4 embodiment, if the recording requirements are not too critical, it is possible to do away with the constant torque feature altogether.

The invention has been described in detail with particular reference to preferred embodiments thereof, but it will be understood that variations and modifications can be effected within the spirit and scope of the invention.

What is claimed is:

1. A reel drive apparatus for use with a tape recorder of the type that uses a coaxial reel cassette having a concentric friction gear that associates with the reel drive apparatus when the cassette is placed on the recorder, the friction gear having a first friction surface and a second friction surface concentric therewith and defining a recess therebetween, the reel drive apparatus comprising:
   a friction wheel mounted for unidirectional rotation on a flexible shaft;
   means for supporting said shaft and guiding said friction wheel into the recess defined between the first and second friction surfaces when the cassette is placed on the recorder, said means supporting said shaft in a neutral position out of contact with either friction surface; and
   means for flexing said flexible shaft and alternately engaging said friction wheel with either the first or second concentric friction surface whereby the direction of reel rotation is reversed.

2. In a coaxial reel tape cassette provided for use with a tape player of the type having a drive member for cooperating with rotatable elements in the cassette, the cassette including first and second reels coaxially mounted for rotation therein, the improvement wherein the rotational elements comprise:
   a first annular flange member associated with the first reel for rotating the first reel at a first velocity;
   a second annular flange member associated with the second reel for rotating the second reel at a second velocity, said second annular flange member disposed concentrically with respect to said first annular flange member; and
   said first and second concentric annular flange members together forming means defining an annular recess therebetween, said means defining said annular recess further adapted to receive the drive member freely therein for selective cooperation with said first and second annular flange members whereby said first and second reels are rotated at said first and second velocities, respectively, when corresponding said first and second flange members are selectively engaged by the drive member.

3. A coaxial reel tape cassette for use with a tape recorder having a tape drive member which associates with the reels when the tape cassette is placed on the recorder, the cassette comprising:
   a window in the cassette for receiving the tape drive member when the cassette is placed on the recorder;
   a first reel mounted for rotation in the cassette, said first reel having a journal extending therefrom toward said window;
   a sleeve extending from said journal and having a surface for associating with the tape drive member;
   a second reel mounted between said first reel and said sleeve for rotation about said journal, said second reel having a skirt extending therefrom toward said window and concentrically surrounding said sleeve also for associating with the tape drive member; and
   said sleeve and said skirt forming means defining an annular space therebetween into which the tape drive member enters for alternately engaging either said skirt or sleeve and thereby reversibly rotating said reels.

4. In a tape recorder having a reel drive apparatus provided for use with a tape container of the type having a complementary reel drive apparatus comprising first and second concentrically disposed flange members defining a recess therebetween and situated opposite a window therein, the improvement wherein the recorder reel drive apparatus comprises:
   a frictional drive wheel mounted on a flexible shaft adapted to enter the cassette through the window and occupy the recess defined between the first and second flange members.
   means for flexing said flexible shaft so that said frictional drive wheel alternately engages either the first or second flange member for driving the tape at two different velocities.

* * * * *